Patented Oct. 10, 1950

2,525,301

UNITED STATES PATENT OFFICE 2,525,301

ALUMINUM PASTE PIGMENT

Alexander F. Knoll, Westfield, N. J., assignor to Metals Disintegrating Company, Inc., Elizabeth, N. J., a corporation of New Jersey No Drawing. Application September 27, 1946, Serial No. 699,637

4 Claims. (Cl. 106—290)

This invention relates to improvements in metallic paste pigments of the kind known to the art as aluminum paste pigment. Such a paste pigment is adapted to be added to a varnish or other vehicle to form paint, inks and similar products. As manufactured, the aluminum paste consists essentially of flakes of aluminum metal, i. e. of aluminum or aluminum base alloy, pasted or mixed with a suitable liquid phase such as mineral spirits or other vehicle. The metal flakes usually represent at least 50 percent by weight of the paste and sometimes form as much as 90 percent by weight of the total paste. The paste likewise contains a leafing agent. Leafing agents are well known both in composition and function. In most commercial pastes the leafing agent is a fatty acid, stearic acid being presently widely used. Such leafing agents are considered as being associated with the surfaces of the metal flakes. In any event, the agent imparts to the flakes the property of "leafing," i. e. forming a layer of metallic pigment on the surface of the vehicle with which the paste is thoroughly mixed. Sometimes an excess of leafing agent, over that necessary to promote leafing, is furnished in the paste to impart a greater resistance to deterioration in storage. These aluminum paste pigments may be and are, made in various ways, some processes of manufacture producing a better paste than others but all producing a product such as just described.

To a greater or lesser extent all such pastes tend to suffer deterioration of leafing power when stored for relatively long periods under normal conditions. These pastes, are moreover, usually stored in metal containers and periodically, and unpredictably, batches thereof will generate sufficient gas within the container to distort the same or to even cause the container walls to crack open. At least one cause of leafing power deterioration and a principal cause of gas generation upon storage is the presence of water or moisture in the aluminum paste pigment. While every reasonable effort is usually made during manufacture to prevent the inclusion of water or moisture in the paste, or in the package containing the same, some moisture will at times be included with the result that gas is generated in the package and, perhaps separately or perhaps as the result thereof, deterioration of leafing power is sometimes accelerated.

The principal object of this invention is to provide an improved aluminum paste pigment which, when packaged, will not generate gas or at least will gas to a lesser extent than pastes heretofore used. A further object of the invention is to provide an aluminum paste pigment in which tendency to deterioration of leafing power during storage, or after mixture with vehicle to form a paint, is retarded or reduced. A still further object is to provide methods by which pastes of these characteristics may be uniformly manufactured.

The present invention is predicated upon the addition to an aluminum paste pigment of the character described of an amount of compound selected from the class consisting of the anhydrides and the ketenes of the fatty acids represented by the formula $C_nH_{2n+1}CH_2.COOH$ where $n$ is not less than 12 nor greater than 18. The amount of the anhydride or ketene used to obtain the result of this invention will vary with the amount of water which may be present in the aluminum paste pigment. The water referred to is uncombined water, it being possible that some water of combination may be present in a paste of this character, in a hydrated aluminum oxide, a basic stearate or similar compound. As little as 0.001 percent by weight of water in these paste pigments may cause the difficulties mentioned but in many paste products uncombined water may make up as much as 0.1 to 0.5 percent of the product. The amount of anhydride preferably added is in excess of that required by the reaction

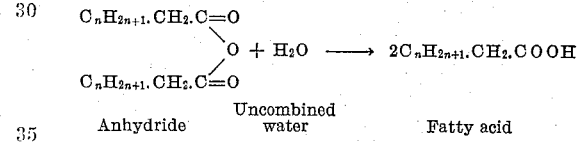

Anhydride + Uncombined water → Fatty acid and the amount of ketene preferably added is in excess of that required by the similar reaction

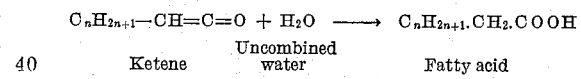

Ketene + Uncombined water → Fatty acid the excess in each case being precautionary not only to promote the reactions set forth but likewise to react with any moisture which may be occluded on or present in the surface of the container in which the aluminum paste pigment is packaged. Smaller amounts are however beneficial and results towards diminishing gas pressure will be secured when as little as 0.03 percent of the anhydride or ketene is thoroughly mixed with the paste.

Since the fatty acids are, as above mentioned, substances commercially used to promote leafing of the metal flake in the vehicle with which the paste is mixed and since the reactions above noted will eventually produce amounts of such acids, it is possible, if desired, to originally add to the paste what would normally be a deficiency of leafing agent and to rely upon anhydride or ketene to eventually supply the deficiency. However, this is not preferred practice since the reaction may not go to completion before the paste is used and, as above noted, the amount of uncombined water in any one batch of paste may be of uncertain amount. For these same reasons I prefer, in the manufacture of paste in accordance with this invention, to add a preventive amount of anhydride or ketene such as will normally counteract such water as may be present. Amounts varying from 0.1 to 1 percent of the weight of paste will usually suffice for this purpose.

The ketene or anhydride may be incorporated in the paste, as by simple mixing, at any stage of manufacture or after manufacture is otherwise complete, the stage and manner of incorporation forming no part of this invention.

Having thus described my invention, I claim:

1. An improved aluminum paste pigment comprising aluminum flakes, a liquid hydrocarbon phase, a leafing agent, uncombined water and an amount of a compound selected from the class consisting of the anhydrides and ketenes of those fatty acids represented by the formula $C_nH_{2n+1}$—$CH_2.COOH$, where $n$ is not less than 12 nor greater than 18, said amount being in excess of that required to react with said water.

2. An improved aluminum paste pigment comprising aluminum flakes, a liquid hydrocarbon phase, a leafing agent and 0.1 to 1 percent by weight of a compound selected from the class consisting of the anhydrides and the ketenes of those fatty acids represented by the formula $C_nH_{2n+1}.CH_2COOH$, where $n$ is not less than 12 nor greater than 18.

3. An improved aluminum paste pigment comprising aluminum flakes, a liquid hydrocarbon phase, a leafing agent, uncombined water and an amount of a compound selected from the class consisting of the anhydrides and ketenes of those fatty acids represented by the formula $C_nH_{2n+1}$—$CH_2.COOH$, where $n$ is not less than 12 nor greater than 18, said amount being sufficient to react with a substantial amount of water, said paste being more uniform in resistance to deterioration than the same paste not containing said anhydrides and ketenes.

4. An improved aluminum paste pigment comprising aluminum flakes, a liquid hydrocarbon phase, a leafing agent and at least 0.03 per cent by weight of a compound selected from the class consisting of the anhydrides and the ketenes of those fatty acids represented by the formula $C_nH_{2n+1}.CH_2.COOH$ where $n$ is not less than 12 nor greater than 18.

ALEXANDER F. KNOLL.

No references cited.